(12) United States Patent
Simske et al.

(10) Patent No.: US 9,197,657 B2
(45) Date of Patent: Nov. 24, 2015

(54) INTERNET PROTOCOL ADDRESS DISTRIBUTION SUMMARY

(71) Applicant: HEWLETT-PACKARD DEVELOPMENT COMPANY, L.P., Houston, TX (US)

(72) Inventors: Steven J Simske, Fort Collins, CO (US); Malgorzata M Sturgill, Fort Collins, CO (US); David S Kellar, Corvallis, OR (US); Mark Jacobsen, Galway (IE); Gary Maloney, Galway (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/628,438

(22) Filed: Sep. 27, 2012

(65) Prior Publication Data

US 2014/0090053 A1    Mar. 27, 2014

(51) Int. Cl.
*H04L 29/06* (2006.01)

(52) U.S. Cl.
CPC .......... *H04L 63/1425* (2013.01); *H04L 63/105* (2013.01); *H04L 63/1458* (2013.01)

(58) Field of Classification Search
CPC . H04L 63/14; H04L 63/1408; H04L 63/1416; H04L 63/1425; H04L 63/1458; H04L 63/105

USPC ............................................ 726/6, 13, 22–25
See application file for complete search history.

(56) References Cited

U.S. PATENT DOCUMENTS

| 7,639,714 | B2 * | 12/2009 | Stolfo et al. | 370/474 |
| 2008/0320119 | A1 | 12/2008 | Achan et al. | |
| 2010/0094868 | A1 * | 4/2010 | Leung et al. | 707/726 |
| 2010/0125663 | A1 * | 5/2010 | Donovan et al. | 709/224 |
| 2010/0138919 | A1 * | 6/2010 | Peng et al. | 726/22 |
| 2010/0284282 | A1 | 11/2010 | Golic | |
| 2010/0332537 | A1 | 12/2010 | El Emam et al. | |
| 2012/0036352 | A1 | 2/2012 | Tovar et al. | |

OTHER PUBLICATIONS

Burkhart, M. "Enabling Collaborative Network Security with Privacy-Preserylng Data Aggregation", Feb. 6, 1978.
Kind, A. et al, "Histogram-Based Traffic Anomaly Detection", Jun. 2009.

* cited by examiner

*Primary Examiner* — Joseph P Hirl
*Assistant Examiner* — Thomas Gyorfi
(74) *Attorney, Agent, or Firm* — Hewlett-Packard Patent Department (57) ABSTRACT

Examples disclosed herein relate to an Internet Protocol address distribution summary. A processor may determine a statistical distribution between at least one portion of bits of Internet Protocol addresses accessing a website and determine a summary value representative of the degree of change within the statistical distribution. The processor may output the summary value.

19 Claims, 5 Drawing Sheets

Entropy of Histogram of Website X > Entropy of Histogram of Website Y ⟶ 302

```
        IP Address Permissions

User 1        Entropy
User 2        Histogram
User 3        Histogram
User 4        Entropy
User 5        Entropy
```
— 500

FIG. 5

```
   IP Address A.B.C.D Histogram Byte
              Permissions

User 1        A.B.C.D Histogram
User 2        A.B Histogram
User 3        Entropy
User 4        A.B.C, A.B Histograms
User 5        A, B, C Histograms
```
— 600

FIG. 6

INTERNET PROTOCOL ADDRESS DISTRIBUTION SUMMARY

BACKGROUND

Analysis of Internet Protocol addresses accessing a website may be used to detect a cyber attack. For example, a denial of service attack may occur where an IP address or group of IP addresses continually access the website to the point that the website is unable to respond to requests. In some cases, actions may be taken to mitigate the cyber attack where a warning about the IP addresses or group of IP addresses performing the attack is provided.

BRIEF DESCRIPTION OF THE DRAWINGS

The drawings describe example embodiments. The following detailed description references the drawings, wherein.

DETAILED DESCRIPTION

Analysis of Internet Protocol ("IP") addresses accessing a website may be used to detect a cyber attack. However, privacy issues arise when tracking and storing the specific Internet Protocol addresses because they may be traced back to a user identity or user region. Thus, it is desirable to anonymize IP address information used to evaluate the likelihood of a cyber attack.

In one implementation, IP addresses are anonymized to allow a cyber attack to be detected in a manner unlikely to be traceable to the specific IP address. For example, a processor may determine a statistical distribution between at least a portion of the bits of Internet Protocol addresses accessing a website, such as where a first IP address comprises 1% of the IP addresses accessing the website and a second IP address comprises 10% of the IP addresses accessing the network.

A summary value may be determined that represents the degree of change within the statistical distribution. For example, a statistical distribution with each IP address having between 1% and 2% of the IP addresses may have a low value of change compared to a statistical distribution where most IP addresses have a 1% and 2% access level and one IP address constitutes 10% of the IP addresses accessing the website.

The summary value may be output such that an administrator may determine the likelihood of a cyber attack based on the summary value instead of or in addition to reviewing more specific information about the accessed IP addresses. A denial of service cyber attack may occur where a particular IP address or group of IP addresses continually access a website. As an example, a group of IP addresses may flood a digital authentication service with requests such that the website is no longer able to respond. In some cases, the website may associate a transaction code with a particular user, user transaction, or user session. A cyber attack may involve flooding the website with transaction codes such that the website loses confidence in legitimate web based transaction code verification attempts from other users. A cyber attack from the same IP address may be an attempt to test transaction codes to determine a valid transaction code capable of providing the attacker access to the website.

Knowledge about the distribution of the IP addresses accessing a website may be used to determine the beginning of a cyber attack, such as denial of service attacks or transaction code related attacks. The repetitious IP addresses may be discovered before the increased traffic is large enough to prevent the response of the website in the case of a denial of service attack. The IP addresses may be discovered before the attacker is able to determine one of the valid transaction codes.

Providing the summary value may allow a cyber attack to be detected while anonymizing the Internet Protocol addresses of individuals accessing the website. In one implementation, user access levels may be established, such as where a first user has access to the summary value and a second user has access to the statistical distribution information. The user access controls may be refined by providing a first user with access to a summary value or statistical distribution of different portions of the bits of the Internet Protocol addresses compared to a second user. The user permission rules may be used to further protect the identity of individuals accessing the website.

Figure 1:
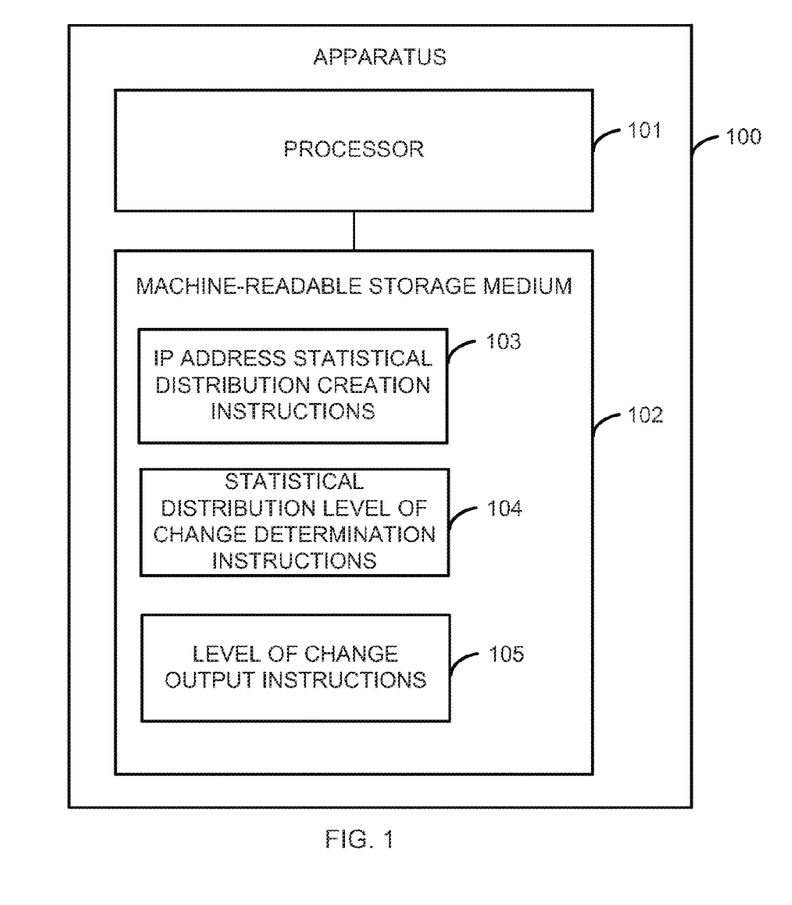
FIG. 1 is a block diagram illustrating one example of an apparatus to create an Internet Protocol address distribution summary.

FIG. 1 is a block diagram illustrating one example of an apparatus to create an IP address distribution summary. The apparatus 100 may be used to provide information about the IP addresses accessing a website without allowing a user to view the individual IP addresses. The apparatus 100 may be any suitable computing device, such as a server, desktop, or laptop computer. In one implementation, the same website server providing the website service may include the functionality of apparatus 100 for determining the likelihood of a cyber attack. For example, the apparatus 100 may communicate with user devices, such as mobile, laptop, or desktop devices, via a network. In one implementation, the apparatus 100 is a separate computing device that receives information about IP addresses accessing a different server. The apparatus 100 may itself provide a web service for cyber attack detection. For example, multiple entities or multiple websites supported by the same entity may provide their IP address information to the apparatus 100 for analysis, and the apparatus 100 may send information to the entity where determined a high likelihood of a cyber attack.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium.

The machine-readable storage medium 102 may include IP address statistical distribution creation instructions 103, statistical distribution level of change determination instructions 104, and level of change output instructions 105. The IP address statistical distribution creation instructions 103 may include instructions to create a histogram representing a statistical distribution of IP addresses accessing a website. For example, the histogram may compare the number of a particular IP address or group of IP addresses accessing a website to the overall number of IP addresses accessing the website.

The statistical distribution level of change determination instructions 104 may include instructions for determining the randomness of the statistical distribution. For example, flatter statistical distributions with a more even distribution of the number of website accesses from each IP address or group of IP address may have a higher entropy level indicating more change among the IP addresses than a histogram with a more uneven distribution. The more uneven distribution may be caused from an IP address or set of IP addresses representing a disproportionate number of website accesses. A lower change level may indicate more repeat accesses and a potential cyber attack.

The level of change output instructions 105 may include instructions to output the level of change by displaying, transmitting, or storing the information. The level of change may be, for example, an entropy level. The change level information may be provided to a user through a user interface. In one implementation, the change level is evaluated by the processor 101, and information about the change level is provided to a user if the change level meets one or more particular criteria, such as if the change level is below a threshold or exhibits a particular amount of change from previous change levels or a target change level. In one implementation, the processor performs more analysis if the change level meets a particular criterion, such as being below a threshold, to determine more information about the possibility of a cyber attack. The processor may output information indicating a likelihood of a cyber attack instead of or in addition to the actual entropy level.

In one implementation, the processor 101 provides a service to a website, and the processor 101 outputs information about the statistical distribution randomness or level of change to the web server or an entity associated with the web server. The processor 101 may determine the IP address or group of IP addresses responsible for the cyber attack if the change level is below a threshold. The processor 101 may block the IP addresses or group of IP addresses from accessing the website, or may send information about the IP addresses or group of IP addresses to another processor to block access of the identified IP addresses. The processor 101 may send information about the identified IP addresses to other subscribers of the service in addition to the subscriber experiencing the cyber attack. For example, the malicious IP addresses may attempt a similar attack on another website at a later time.

Figure 2:
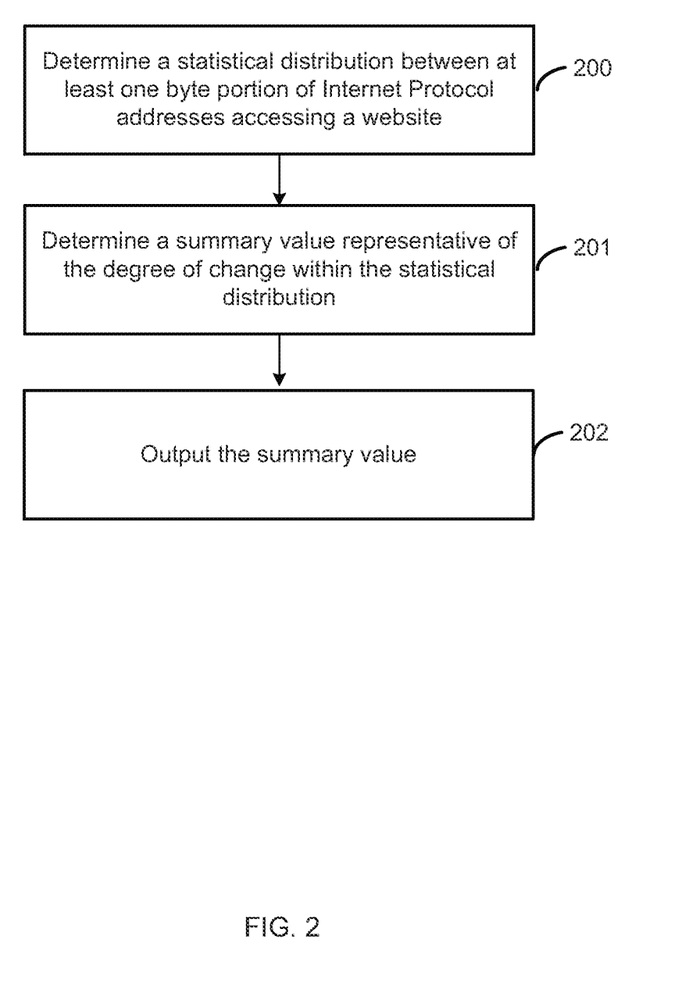
FIG. 2 is a flow chart illustrating one example of a method to create an Internet Protocol address distribution summary.

FIG. 2 is a flow chart illustrating one example of a method to create an IP address distribution summary. In one implementation, IP addresses of devices accessing a website are aggregated and summarized such that the individual IP addresses are not provided when analyzing the network traffic. For example, a statistical distribution of the IP addresses may be created, and a summary of the amount of change between the IP address in the statistical distribution may be used to determine the likelihood of a cyber attack. The method of FIG. 2 may be implemented, for example, by the processor 101 of FIG. 1.

Beginning at 200, a processor determines a statistical distribution between at least a portion of bits of IP addresses accessing a website. The processor may receive the information about the individual IP addresses in any suitable manner. For example, the processor may receive the IP address information via a network or may retrieve the IP address information from a storage device. In one implementation, the processor creates the statistical distribution as IP addresses access the website, and the individual IP addresses are not otherwise stored. The IP address information may be stored and deleted after the statistical distribution is created. In one implementation, the IP addresses are retained, and user permissions information is associated with the individual IP address information such that some users have access to view the statistical distribution information but not the individual IP address information.

The website may be any suitable website that receives network traffic. For example, the website may provide a cloud service to user computing devices. The processor may analyze IP addresses related to a particular website or a group of websites. The processor may create a statistical distribution for each of multiple websites, or a statistical distribution aggregating IP address accesses from the multiple websites.

The statistical distribution between the IP addresses may indicate the percentage of IP address accesses to the website from a particular IP address or group of IP addresses. The statistical distribution may be represented in any suitable manner. The statistical distribution may graphically represented, such as in a histogram. The statistical distribution may be stored as an image of the graphical representation. The statistical distribution may be stored as number values associated with each of the IP addresses. In one implementation, the statistical distribution is displayed to a user if particular criteria are met, such as where the number of accessing IP addresses is above a threshold.

The statistical distribution may be based on a particular time period. For example, a new statistical distribution may be created for each hour, day, or week of website access. The statistical distributions of the different time periods may be compared. In one implementation, the processor selects a time period for the statistical distribution based on user input.

The statistical distribution may be created from the entire set of IP addresses or a portion of the bits of the IP addresses. The distribution of the IP addresses may be used for different purposes. In some cases, it may be desirable to know the distribution of a first portion of each of the IP addresses accessing the website, for example to determine the likely country of origin, and in other cases, it may be desirable to know the distribution of the entirety of each of the IP addresses accessing the website. In one implementation, the statistical distribution between the entire IP addresses is compared, such as where distinct IP addresses are compared against one another. In one implementation, a statistical distribution is determined between bins representing groups of IP addresses. The bins of IP addresses may be based on particular bits being the same within the IP addresses. For example, the first half of the bits of the IP addresses may be compared such that an IP address 202.1.2.3 and 202.1.200.400 are placed in the same bin. In some cases, the statistical distribution of the bins of IP addresses may be saved, and the actual IP addresses may not be stored in order to provide for greater privacy. Creating a statistical distribution of the portion of bits of the IP addresses that may be useful for analysis may prevent the complete IP addresses from being viewable.

Continuing to 201, the processor determines a summary value representative of the degree of change within the statistical distribution. The summary value may indicate any suitable summary of the statistical distribution. The summary value may indicate a likelihood that the distribution of IP addresses is a random distribution. The summary value may be determined based on a change or variance method, such as a delta, t, or z test applied to historical data.

The relative value of the summary value over a period of time may be used to detect anomalies in network traffic. For example, depending on how the summary value is determined, a higher or lower value may indicate a higher likelihood of greater repetitious IP address traffic.

In one implementation, the summary value is an entropy level related to the statistical distribution. The entropy level may be represented by the formula below where each bin represents a group of IP addresses in the statistical distribution. The percentage data in bin i may be determined, for example, at block 200. The entropy level may be determined by:

$$\text{entropy} = -\Sigma_{i=1}^{H}(\text{percentage data in bin } i)*\ln(\text{percentage data in bin } i)$$

The percentages of the bins may total 1.00, and the natural log of each bin percentage may be determined and multiplied by the percentage to amplify the bins where the percentage of accesses is higher. A lower entropy level indicates more or higher peaks within the statistical distribution, and a higher entropy level indicates a more even distribution of IP addresses. A lower entropy level may be indicative of some cyber attack(s), particularly those related to repeated network traffic from the same IP address or IP addresses originating from the same area or entity.

The entropy level may be sensitive to changes in the flatness of the histogram, such that a bin of IP addresses with a percentage of accesses disproportionate to the others may affect the entropy level value. In some cases, the entropy level may reveal a small number of repetitions of IP addresses, such as where an IP address accesses a website a few dozen times. The sensitivity of the entropy level may depend on the portion of the bits evaluated in the statistical distribution and the percentage of repeated or nearly repeated IP addresses.

Moving to 202, the processor outputs the summary value. The processor may store, display, or transmit the summary value. The summary value may be output to another application. In one implementation, the processor checks permissions information to determine whether to output the summary value. For example, permissions information may be stored in a storage device accessible to the processor. The processor may receive a request for the summary information from a user and check the permissions information to determine if the user has permission to view the summary information.

In one implementation, the processor also outputs the statistical distribution information. For example, permissions information may be associated with users where some users have access to the statistical distribution information and some users have access to the summary value information.

In one implementation, the processor also outputs the individual IP addresses. For example, there may be multiple permissions levels where some users have access to the individual IP addresses, and some users have access to either the statistical distribution or summary value information.

In one implementation, the processor further evaluates the summary value and outputs information based on the evaluation. For example, the processor may output a warning if the summary value is above or below a threshold. The processor may translate the summary value into a likelihood of a cyber attack.

In one implementation, the summary value is tracked over time such that the beginning of a denial of service attack may be detected when a larger number of a particular IP address or group of IP addresses begins to access the website, but before the website is unable to service requests because of the flood of traffic. The processor may monitor IP addresses and/or transaction codes associated with potential cyber attacks and update responses to requests to the website in any suitable manner. In one implementation, once a potential cyber attack is suspected, the IP addresses associated with the attack are determined, such that the particular IP addresses are de-anonymized. In one implementation, the IP addresses associated with the cyber attack may be blocked. In some cases, the timing of the attack may be used to determine the transaction codes used at that time that is likely associated with the attack. Preventing the use of these transaction codes may be part of the response to the potential cyber attack. The transaction codes associated with cyber attack may be blocked such that other legitimate transaction codes are still allowed access to the website.

In some cases, the processor stores records about the transaction code access attempts. The processor may log transaction code information associated with a cyber attack. For example, two access attempts may be allowed for each transaction code. In the case of a denial of service attack, an attacker may attempt multiple transaction codes two or more times in an attempt to discover valid transaction codes. The processor may determine which uses of the transaction codes are associated with the denial of service attack so that a valid user, such as a user associated with a different IP address than the denial of service attacker, may be able to use the transaction code that would otherwise be denied due to two access attempts. In one implementation, information in addition the specific transaction code or IP addresses related to the cyber attack may be used in the response. For example, if a cyber attack originates from a mobile gateway, network traffic to the website from a mobile gateway may be temporarily or permanently blocked.

The processor may automatically block the IP address or group of IP addresses associated with the attack. In one implementation, information about the IP address or group of IP addresses is sent to another computing device to block the traffic. In one implementation, the method is associated with a service where multiple websites subscribe, and an IP address associated with an attack on a first subscribing website may also be blocked from the other subscribing websites to prevent a future attack from the IP address.

In one implementation, the processor provides a security layer in addition to the anonymization. For example, the IP addresses may be encrypted or truncated. The histogram information or the summary value may also be encrypted.

Figure 3:
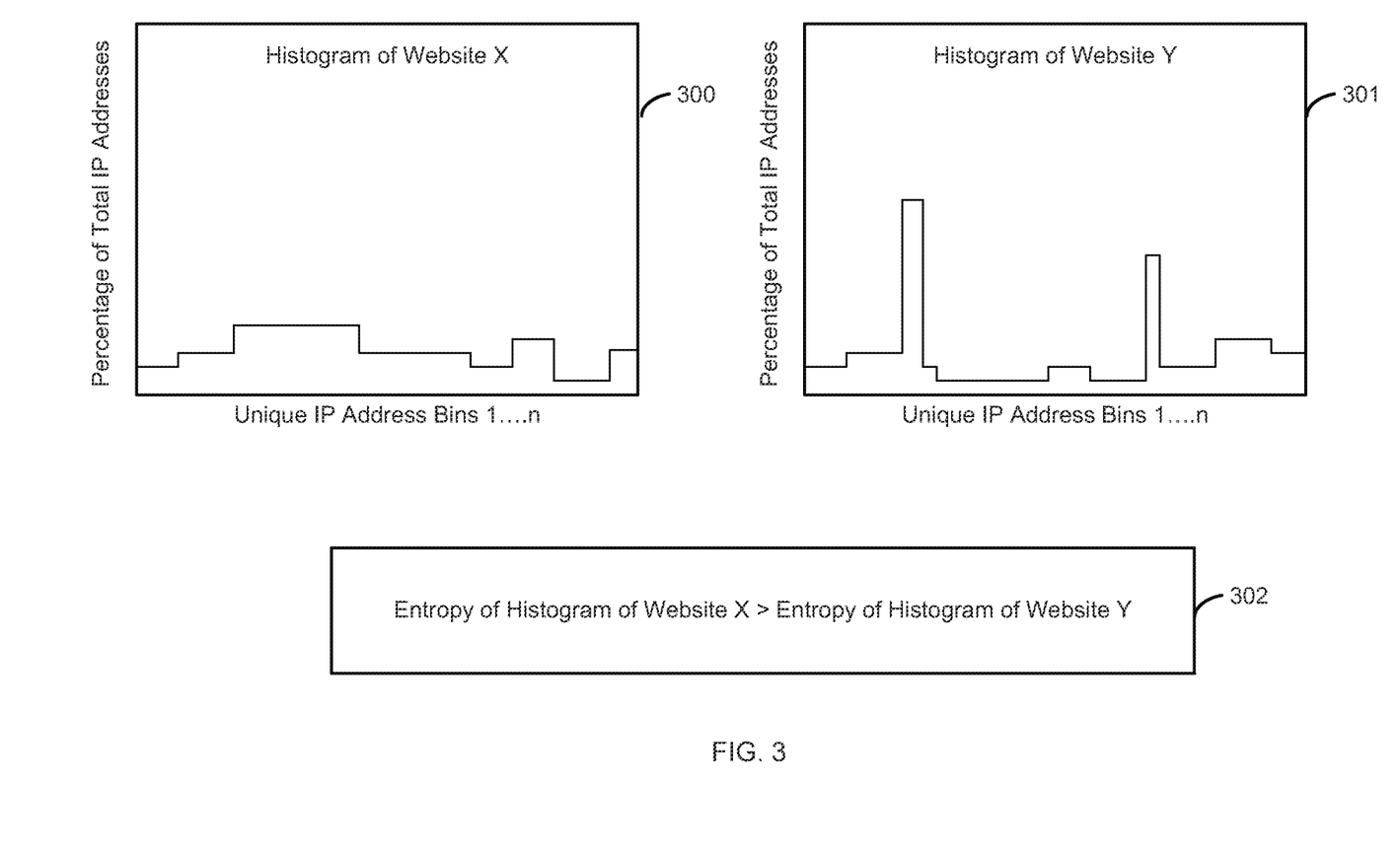
FIG. 3 is a diagram illustrating one example of comparing entropy levels of Internet Protocol addresses accessing websites.

FIG. 3 is a diagram illustrating one example of comparing entropy levels of Internet Protocol addresses accessing websites. For example, histogram 400 shows a histogram of IP addresses accessing a website X. The x-axis of the histogram 400 shows the unique bins of IP addresses 1 . . . n accessing website X. For example, a first position on the x-axis may be 100.100.2.2 and a second position on the x-axis may be 100.100.2.3. The bins may be related to portions of bits within, such as where the first two bytes of the IP address are compared, in which case accesses to 100.100.2.2 and to 100.100.2.3 are included in the same position on the x-axis. The y-axis of the histogram 400 shows a statistical distribution of the IP addresses accessing website X. For example, the y-axis may show the number of times each IP address accessed the website or the percentage of the total IP addresses accessing the website representing each IP address, such as where the IP address 100.100.2.2 accessed the website twice or where the IP address 100.100.2.2 was 3% of the accesses to website X.

The histogram 401 showing the distribution of IP addresses accessing website Y is similar to histogram 400, with the x-axis representing bins of IP addresses accessing website Y and the y-axis representing the percentage of each IP address as a total of the IP addresses accessing website Y. The percentage may be a percentage over a particular time period, such as over an hour, day, or week.

Histogram 400 shows a more even distribution of IP addresses than histogram 401. Histogram 401 has two spikes in the histogram representing a disproportionate rate of access by two particular IP addresses or groups of IP addresses. Block 302 shows a comparison of the entropy level of website X to the entropy level of IP addresses accessing website Y. The entropy level of website Y is lower due to the two spikes in IP addresses accessing the website. A user with permissions to view entropy levels, but not individual histograms may compare the entropy level of website X to the entropy level of website Y to determine that a cyber attack may be occurring.

Figure 4:
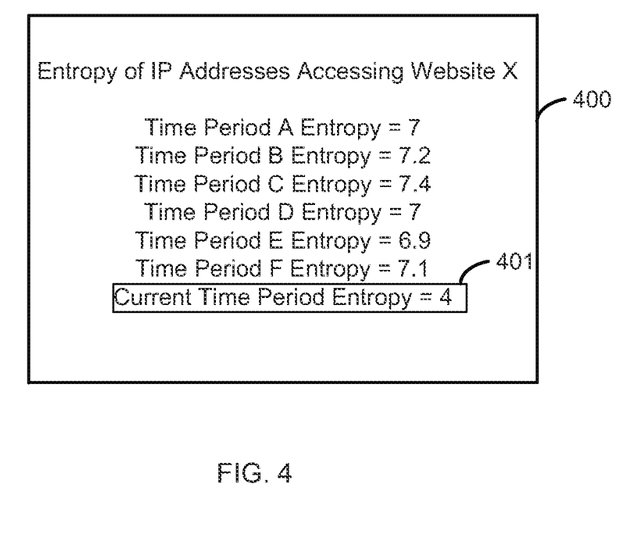
FIG. 4 is a diagram illustrating one example of comparing entropy levels of a website over time.

FIG. 4 is a diagram illustrating one example of comparing entropy levels of a website over time. Block 400 shows the entropy of the IP addresses accessing website X during different time periods. For example, at time period A, the entropy is 7 and at time period B, the entropy is 7.2. The entropy at the current time period is 4. Because the entropy is much lower than the typical entropy of the website, the entropy level 4 may indicate a cyber attack, such as a Denial of Service attack from a particular IP address repeatedly accessing the website.

In one implementation, a processor provides a warning if the entropy is below a threshold. The threshold may be provided by a user or automatically determined by the processor. In one implementation, a warning is provided where the difference in an entropy of a current time period compared to an average or median value of past time periods is within a particular percentage different. The time periods for comparison may be based on particular events or divisions. For example, evening IP address traffic may be compared to evening IP address entropy levels.

Figure 5:
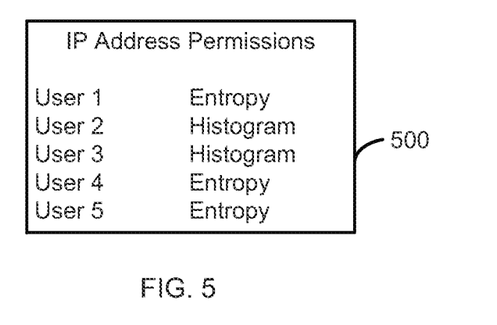
FIG. 5 is a diagram illustrating one example of providing user access permissions to Internet Protocol address information.

FIG. 5 is a diagram illustrating one example of providing user access permissions to Internet Protocol address information. Block 500 shows a list of users and their associated permissions in an IP address anonymization scheme. For example, the permissions may be set by an administrator and stored in a database or other storage accessible to a processor for determining and outputting IP address histogram and entropy information. In block 500, users 1, 4, and 5 have access to entropy level information, and users 2 and 3 have access to histogram information.

Preventing some users from having more detailed information about IP address traffic provides more privacy to individuals accessing the website. Some users may be provided entropy information and others may be provided entropy information and/or histogram information. More information about the individual IP addresses may be deduced by viewing the histogram, but making the information available to a smaller audience provides some privacy protection.

Figure 6:
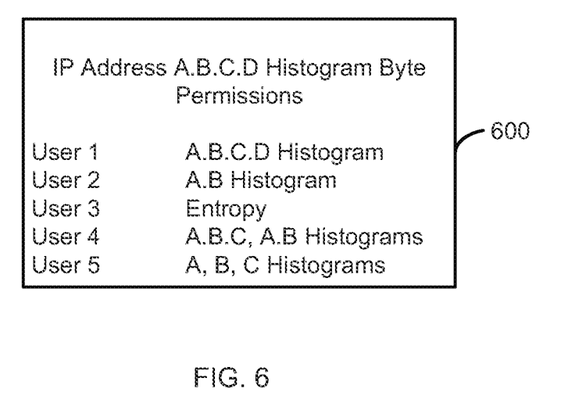
FIG. 6 is a diagram illustrating one example of providing users with permissions to summary statistical distribution information related to different bit portions of Internet Protocol addresses.

FIG. 6 is a diagram illustrating one example of providing users with permissions to summary statistical distribution information related to different bit portions of Internet Protocol addresses. As one example, 15 histograms may be created for IP addresses accessing a website where the 15 histograms represent the different combinations of a 4 byte IP address. For an IP address A.B.C.D with A, B, C, and D each representing a byte of an IP address, such as an IP v4 IP address, the histograms may be the following: A; B; C; D; A+B; A+C; A+D; B+C; B+D; C+D; A+B+C; A+B+D; A+C+D; B+C+D and A+B+C+D. In Block 600, user 1 has access to a histogram of the bits in A+B+C+D, an entire 4 byte IP address, user 2 has access to a histogram of the first two bytes of the IP addresses, user 4 has access to a histogram of A+B+C and to A+B, and user 5 has access to a histogram of the individual first 3 bytes, A, B, and C. The histograms may be created individually of the different bytes without keeping the IP addresses as a whole. For example, a separate histogram may be created for the A byte and the B byte instead of or in addition to a histogram of A.B.

As an example, in a histogram of A+B+C+D, a 32 bit IP address of a single repeat attacker will show up as four peaks, one for each byte of the IP address assuming that the four bytes of the IP address are different. Separating out the four bytes as different positions in the histogram may make it more difficult for a viewer to reverse engineer the individual IP addresses. However, a histogram with four peaks may have a lower entropy level that is used to indicate the possibility of an attack.

In one implementation, a user may provide input indicating which histograms should be created. For example, a user may be interested in the first two bytes of an IP address to determine the likely country of origin of the IP address. The processor may create the histograms requested by the user input.

In Block 600, user 3 has access to the entropy level of the histograms, but not the histograms themselves. As such user 3 is less likely to be able to deduce information about the specific IP addresses as compared to the other users. In one implementation, permissions may be further distinguished based on entropy levels associated with different bits of the IP addresses. For example, a first user may have access to entropy level information related to the first two bytes of IP addresses, and a second user may have access to entropy level information related to all four bytes of IP addresses accessing the website.

Histograms of different bit portions of the IP addresses may be created in any suitable manner. For example, a histogram may be created with bins representing the first 3 bits of the IP addresses. The histograms may be applied to different lengths of IP addresses. For example, a 5 bit histogram may be applied to a 32 bit IPv4 IP address or to a 128 bit IPv6 IP address. The length of the IP addresses may affect the level of anonymity offered by the histogram. For example, an 8 bit histogram of a 128 bit IP address may be more difficult to trace to individual IP addresses, but may be sensitive enough to reveal repeat IP address traffic.

Anonymizing IP address website traffic in a manner that preserves the ability to detect a cyber attack without compromising the privacy of the users of the website. Creating a statistical distribution and a summary value associated with the statistical distribution allows for different viewer permission levels and allows for some viewers to receive information about a potential cyber attack without receiving detailed IP address information.

The invention claimed is:

1. An apparatus, comprising:
a processor; and a machine-readable non-transitory storage medium comprising instructions that, when executed by the processor, cause the processor to:
  detect whether a website is being subjected to a cyber attack without tracing any specific Internet Protocol address accessing the website, by:
    creating a statistical distribution indicating percentages of the same bit portions of Internet Protocol addresses accessing the website during a particular time period;
    determining an entropy level within the statistical distribution, the entropy level indicating an extent to which the percentages relatively vary within the statistical distribution;
    comparing the entropy level to stored information related to a past entropy level such that the statistical distribution itself is not directly compared to a past statistical distribution with which the past entropy level is associated;
    where the difference between the entropy level and the past entropy level is above a threshold, conclude that the website is being subjected to the cyber attack; and
  where the processor has concluded that the website is being subjected to the cyber attack, identify those of the specific Internet protocol addresses accessing the website that are participating in the cyber attack and perform a mitigation action to reduce susceptibility of the website to the cyber attack, the mitigation action related to how the website is operated and is in addition to any warning that the cyber attack is occurring.

2. The apparatus of claim 1, wherein the processor is further to: access
  permissions information related to a user to determine if the user is provided permission to access the statistical distribution; and
  output the statistical distribution if determined the user is provided permission to access the statistical distribution.

3. The apparatus of claim 1, wherein the processor is further to:
  create multiple statistical distributions based on the Internet Protocol addresses,
  wherein each statistical distribution is related to a different bit combination of the Internet Protocol addresses; and
  determine an entropy level of each of the statistical distributions.

4. The apparatus of claim 1, wherein the processor is further to:
  associate a first user with an access level to view the statistical distribution; and
  associate a second user with an access level to view the entropy level.

5. The apparatus of claim 1, wherein a lower entropy level indicates more or higher peaks within the statistical distribution, and a higher entropy level indicates a more even distribution of the Internet Protocol addresses within the statistical distribution.

6. The apparatus of claim 1, wherein the processor is to determine the entropy level by summing individual values corresponding to the percentages within the statistical distribution.

7. The apparatus of claim 6, wherein each individual value comprises a corresponding percentage within the statistical distribution.

8. The apparatus of claim 7, wherein each individual value comprises the corresponding percentage multiplied by a function of the corresponding percentage.

9. The apparatus of claim 8, wherein the function is a natural log of the corresponding percentage.

10. The apparatus of claim 1, wherein the website has a valid transaction code by which access to the website is permitted,
  wherein prior to detecting that the cyber attack has occurred, a predetermined number of unsuccessful attempts at entering the valid transaction code results in blocking the valid transaction code from being used to access the website,
  wherein after detecting that the cyber attack has occurred, the valid transaction code is blocked from being used to access the website only with respect to Internet Protocol addresses associated with the specific Internet Protocol addresses participating in the cyber attack of the web site.

11. A method, comprising:
  detecting, by a processor, whether a website is being subjected to a cyber attack without tracing any specific Internet Protocol address accessing the website, by:
    determining a statistical distribution among a plurality of bit portions of Internet Protocol addresses accessing the website;
    determining a summary value representative of the degree of change within the statistical distribution and indicating an extent to which percentages of the bit portions relatively varying within the statistical distribution, by summing individual values corresponding to the percentages within the statistical distribution;
    comparing the summary value to a threshold, such that the statistical distribution itself is not directly compared to the threshold;
    where the summary value is less than DA the threshold, conclude that the website is being subjected to the cyber attack; and
  where the website has been concluded as being subjected to the cyber attack, identify, by the processor, those of the specific Internet protocol addresses accessing the website that are participating in the cyber attack and perform, by the processor, a mitigation action to reduce susceptibility of the website to the cyber attack, the mitigation action related to how the website is operated and is in addition to any warning that the cyber attack is occurring.

12. The method of claim 11, further comprising determining a likelihood of a cyber attack based on the summary value.

13. The method of claim 11, further comprising securing the summary value using at least one of: encryption and truncation.

14. The method of claim 11, further comprising accessing permissions information associated with a user to determine if the user has permission to access the statistical distribution.

15. The method of claim 11, further comprising:
  creating multiple statistical distributions based on the Internet Protocol addresses,
  wherein each statistical distribution is related to a different bit combination of the Internet Protocol addresses; and
  determining a summary value for each of the statistical distributions.

16. The method of claim 15, further comprising:
  providing a first user access to a statistical distribution of a first bit combination; and
  providing a second user access to a statistical distribution of a second bit combination.

17. A machine-readable non-transitory storage medium comprising instructions executable by a processor to:

detect whether a website is being subjected to a cyber attack without tracing any specific Internet Protocol address accessing the website, by:

creating a statistical distribution indicating percentages of the same bit portions of Internet Protocol addresses accessing the website during a particular time period, determining an entropy level within the statistical distribution indicating an extent to which the percentages relatively vary within the statistical distribution, by summing individual values corresponding to the percentages within the statistical distribution;

comparing the entropy level to stored information related to a past entropy level such that the statistical distribution is not directly compared to a past statistical distribution within which the past entropy level is associated;

where the difference between the entropy level and the past entropy level is above a threshold, conclude that the website is being subjected to the cyber attack; and where the website has been concluded as being subjected to the cyber attack, identify those of the specific Internet protocol addresses accessing the website that are participating in the cyber attack and perform a mitigation action to reduce susceptibility of the website to the cyber attack, the mitigation action related to how the website is operated and is in addition to any warning that the cyber attack is occurring.

18. The machine-readable non-transitory storage medium of claim 17, wherein a lower entropy level indicates more or higher peaks within the statistical distribution, and a higher entropy level indicates a more even distribution of the Internet Protocol addresses within the statistical distribution.

19. The machine-readable non-transitory storage medium of claim 17, wherein each individual value comprises a corresponding percentage within the statistical distribution multiplied by a function of the corresponding percentage.

* * * * *

UNITED STATES PATENT AND TRADEMARK OFFICE
CERTIFICATE OF CORRECTION

PATENT NO. : 9,197,657 B2
APPLICATION NO. : 13/628438
DATED : November 24, 2015
INVENTOR(S) : Steven J. Simske et al.

It is certified that error appears in the above-identified patent and that said Letters Patent is hereby corrected as shown below:

In the claims,

In column 10, lines 15-16, in Claim 10, delete "web site" and insert -- website --, therefor.

In column 10, line 34, in Claim 11, delete "than DA" and insert -- than --, therefor.

Signed and Sealed this
Fourteenth Day of June, 2016

Michelle K. Lee
*Director of the United States Patent and Trademark Office*